US011165717B2

(12) United States Patent
Bandic et al.

(10) Patent No.: US 11,165,717 B2
(45) Date of Patent: Nov. 2, 2021

(54) FABRIC INTERCONNECTION FOR MEMORY BANKS BASED ON NETWORK-ON-CHIP METHODOLOGY

(71) Applicant: Western Digital Technologies, Inc., San Jose, CA (US)

(72) Inventors: Zvonimir Z. Bandic, San Jose, CA (US); Luis Cargnini, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/922,547

(22) Filed: Oct. 26, 2015

(65) Prior Publication Data

US 2017/0118139 A1 Apr. 27, 2017

(51) Int. Cl.
*G06F 13/18* (2006.01)
*H04L 12/933* (2013.01)
(Continued)

(52) U.S. Cl.
CPC .......... *H04L 49/109* (2013.01); *G06F 3/0604* (2013.01); *G06F 3/067* (2013.01);
(Continued)

(58) Field of Classification Search
CPC ...... G06F 3/0604; G06F 3/0647; G06F 3/067; H04L 49/109
See application file for complete search history.

(56) References Cited

U.S. PATENT DOCUMENTS 6,968,394 B1 * 11/2005 El-Rafie .................. H04L 69/16
455/3.01
7,772,880 B2 8/2010 Solomon
(Continued)

FOREIGN PATENT DOCUMENTS

| CN | 102823214 A | 12/2012 |
|----|-------------|---------|
| JP | 2015035117 | 2/2015 |
| KR | 101028806 | 4/2011 |

OTHER PUBLICATIONS

Network Main Memory Architecture for NoC-Based Chips <http://ieeexplore.ieee.org/xpl/articleDetails.jsp?tp=&arnumber=5578270>.
(Continued)

*Primary Examiner* — Rupal Dharia
*Assistant Examiner* — Dixon F Dabipi
(74) *Attorney, Agent, or Firm* — Vierra Magen Marcus LLP (57) ABSTRACT

Embodiments disclosed herein generally relate to the use of Network-on-Chip architecture for solid state memory structures, both volatile and non-volatile, which provide for the access of memory storage blocks via a router. As such, data may be sent to and/or from the memory storage blocks as data packets on the chip. The Network-on-Chip architecture may further be utilized to interconnect unlimited numbers of memory cell matrices, spread on a die, thus allowing for reduced latencies among matrices, selective power control, unlimited memory density growth without major latency penalties, and reduced parasitic capacitance and resistance. Other benefits may include improved signal integrity, larger die areas available to implement memory arrays, and higher frequency of operation.

30 Claims, 5 Drawing Sheets

(51) Int. Cl.
*H04L 12/741* (2013.01)
*H04L 12/707* (2013.01)
*G06F 3/06* (2006.01)

(52) U.S. Cl.
CPC ............ *G06F 3/0647* (2013.01); *H04L 45/22* (2013.01); *H04L 45/74* (2013.01)

(56) References Cited

U.S. PATENT DOCUMENTS

| | | | |
|---|---|---|---|
| 7,978,693 B2 | 7/2011 | Dielissen | |
| 8,386,690 B2 | 2/2013 | Li et al. | |
| 8,391,281 B2* | 3/2013 | Paul | H04L 45/60 370/359 |
| 8,442,057 B2* | 5/2013 | Howe | H04W 72/1242 370/395.42 |
| 8,443,144 B2 | 5/2013 | Yim et al. | |
| 8,719,753 B1 | 5/2014 | Chow et al. | |
| 8,819,616 B2 | 8/2014 | Philip et al. | |
| 9,443,561 B1 | 9/2016 | Roberts et al. | |
| 9,652,425 B2* | 5/2017 | Chen | G06F 13/4022 |
| 9,658,676 B1* | 5/2017 | Witek | G06F 1/3237 |
| 9,699,079 B2* | 7/2017 | Chopra | H04L 45/306 |
| 2002/0184419 A1* | 12/2002 | Creedon | G06F 17/5045 710/100 |
| 2003/0075797 A1 | 4/2003 | Suzuki et al. | |
| 2004/0100832 A1 | 5/2004 | Nakajima | |
| 2008/0005402 A1 | 1/2008 | Kim et al. | |
| 2008/0084893 A1* | 4/2008 | Lee | H04L 47/10 370/410 |
| 2009/0210616 A1* | 8/2009 | Karamcheti | G11C 5/04 711/105 |
| 2010/0061470 A1* | 3/2010 | Wei | H04L 27/2601 375/260 |
| 2011/0235531 A1* | 9/2011 | Vangal | H04L 47/30 370/252 |
| 2011/0320719 A1* | 12/2011 | Mejdrich | G06F 12/0813 711/120 |
| 2012/0159496 A1 | 6/2012 | Dighe et al. | |
| 2013/0028090 A1* | 1/2013 | Yamaguchi | G06F 1/3206 370/235 |
| 2013/0083794 A1* | 4/2013 | Lakshmanamurthy | H04L 12/28 370/390 |
| 2013/0188536 A1* | 7/2013 | Pirskanen | H04W 72/0453 370/281 |
| 2013/0285739 A1 | 10/2013 | Blaquiere | |
| 2014/0156929 A1 | 6/2014 | Falsafi et al. | |
| 2014/0204735 A1 | 7/2014 | Kumar et al. | |
| 2014/0310467 A1 | 10/2014 | Shalf et al. | |
| 2014/0328208 A1 | 11/2014 | Norige et al. | |
| 2014/0376569 A1* | 12/2014 | Philip | G06F 1/04 370/503 |
| 2015/0016172 A1 | 1/2015 | Loh et al. | |
| 2015/0109024 A1* | 4/2015 | Abdelfattah | G06F 17/5054 326/41 |
| 2015/0220470 A1 | 8/2015 | Chen et al. | |
| 2016/0182396 A1* | 6/2016 | Kaul | H04L 49/3018 370/356 |
| 2016/0284046 A1* | 9/2016 | Koker | G06T 11/001 |
| 2016/0344629 A1* | 11/2016 | Gray | H04L 45/60 |
| 2017/0118111 A1 | 4/2017 | Bandic et al. | |
| 2017/0272381 A1* | 9/2017 | Li | H04L 49/103 |

OTHER PUBLICATIONS

Three-Dimensional Network-on-Chip Architecture, <http://link.springer.com/chapter/10.1007/978-1-4419-0784-4_8>.
Bandic, et al., Office Action dated Mar. 8, 2018 for U.S. Appl. No. 14/924,670.
Bandic, et al., Office Action dated May 26, 2017 for U.S. Appl. No. 14/924,670.
Bertozzi et al., Illuminating future 3D architectures with optical networks-on-chip, <http://www.leti-innovationdays.com/presentations/D43DWorkshop/Session7-DesignStrategiesFor3D/D43D13_Session_7_3_DavideBertozzi.pdf>.
Dutoit, et al., A 0.9 pJ/bit, 12.8 GByte/s Wide IO Memory Interface in a 3D-IC based MPSoC, <http://ieeexplore.ieee.org/xpl/login.jsp?tp+&arnumber=6576608>.
Kumar, et al., A Network on Chip Architecture and Design Methodology, Laboratory of Electronics and Computer Systems, Dept of Microelectronics and information Technology, Royal Institute of Technology, Stockholm, Sweden; VTT Electronics, Finland; Spirea AB, Stockholm, Sweden, (Joint Finnish—Swedish EXSITE research program).
Li, et al., Design and Management of 3D Chip Multiprocessors Using Network-in-Memory, <http://dl.acm.org/citation.cfm?id=1136497>.
Srinivasan, et al., A Memory Subsystem Model for Evaluating Network-on-Chip Performance, https:/www.design-reuse.com/articles/25029/memory-subsystem-model-noc-performance.html, accessed on May 31, 2018.
Tavakkol, et al., Network-on-SSD: A Scalable and High-Performance Communication Design Paradigm for SSDs, <http://cs.jpm.ac.ir/~tavakko/downloads/papers/A.Tavakkol-CAL2013.pdf>.
Wassal, et al., Novel 3D memory-centric NoC architecture for transaction-based SoC applications, <http://ieeexplore.ieee.org/xpl/login.jsp?tp+&arnumber=5876934>.
Yang, et al., Three-dimensional image processing VLSI system with network-on-chip system and reconfigurable memory architecture, <http://ieeexplore.ieee.org/xpl/login.jsp?tp=&arnumber=6018893>.
Bandic, et al., Notice of Allowance dated Nov. 2, 2018 for U.S. Appl. No. 14/924,670.
Office Action received for CN Patent Application No. 201610970031.9, dated Jun. 8, 2020, 30 pages.

* cited by examiner

FABRIC INTERCONNECTION FOR MEMORY BANKS BASED ON NETWORK-ON-CHIP METHODOLOGY

BACKGROUND

Field

Embodiments disclosed herein generally relate to data storage systems, and more particularly, to a memory device utilizing Network-on-Chip architecture for the interconnection of memory subarrays, mats, arrays, subbanks, and/or banks.

Description of the Related Art

The cerebral cortex of a computer is a magnetic recording device, which typically may include a rotating magnetic media or a solid state media device. A number of different memory technologies exist today for storing information for use in a computing system.

In recent years, there has been a demand for higher density devices, which maintain a relatively low cost per bit, for use in high capacity storage applications. Today the memory technologies that generally dominate the computing industry are DRAM and NAND flash; however, these memory technologies may not be able to address the current and future capacity demands of next generation computing systems.

Existing non-volatile memory bank architecture employs a classic fabric routing methodology, which has been widely adopted in SRAM, DRAM, FLASH, MRAM, PCM, and ReRAM, as well as with HMC memory banks. This classic methodology limits the amount of memory cells that may be included in a single die as well as the amount of bandwidth and access points to the same memory bank.

Traditionally, memory banks are architectured and organized as banks comprising arrays of subbanks Each subbank may comprise multiple MATs. Each MAT may be composed of four or more subarrays and predecoding logic. As such, H-Tree routing may be used to route the I/O of the subarrays across the die vertically and horizontally. However, approximately 70% of the area is utilized to interconnect the subarrays; therefore, the majority of the surface of the memory is logic interconnection and not memory. As such, the biggest limitation with existing memory bank architecture is the amount of wire necessary to route the entire memory. Excessive amount of wire is the main cause for latency in existing memory banks from SRAM to DRAM. Given the physical limitations of traditional memory banks, subarrays share wordlines to write and read. As such, each bank can only access one subarray at a given time. With such limitations, there may only be one physical access interface, due to complexity and cost, to implement additional interfaces.

Hence, there is a need in art for an improved memory device that utilizes an improved architecture and allows for access to any given subarray in parallel. Furthermore, there is a need in the art for an improved methodology for routing memory banks without employing a majority of the die for routing.

SUMMARY

Embodiments disclosed herein generally relate to the use of Network-on-Chip architecture for solid state memory structures, both volatile and non-volatile, which provide for the access of memory storage blocks via a router. As such, data may be sent to and/or from the memory storage blocks as data packets on the chip. The Network-on-Chip architecture may further be utilized to interconnect unlimited numbers of memory cell matrices, spread on a die, thus allowing for reduced latencies among matrices, selective power control, unlimited memory density growth without major latency penalties, and reduced parasitic capacitance and resistance. Other benefits may include improved signal integrity, larger die areas available to implement memory arrays, and higher frequency of operation.

In one embodiment, a memory device is disclosed. The memory device may include a plurality of nodes. Each node may include a router, a plurality of links interconnecting each router with each plurality of nodes using Network-on-Chip architecture, and at least one memory array. The router may include a plurality of FIFOs, data packet switching logic, and at least one aggregator. Each FIFO may allow for the individual breaking of clock domains across multiple channels. The aggregator may be operatively connected with the data packet switching logic. The at least one memory array may be operatively connected with each router via a link. Each memory array may be accessed via the router.

In another embodiment, a memory device is disclosed. The memory device may include at least one interconnected memory cell matrix. The interconnected memory cell matrix may include a plurality of routers, a plurality of intellectual property cores, and at least one link. Each router may include a plurality of FIFOs. One intellectual property core may be coupled to each router. The at least one link may couple adjacent routers of the plurality of routers utilizing a Network-on-Chip architecture scheme.

In yet another embodiment, a memory device is disclosed. The memory device may include at least one interconnected memory cell matrix. The interconnected memory cell matrix may include a plurality of routers and a plurality of intellectual property cores. Each router may include a plurality of FIFOs, data packet switching logic, and at least one aggregator. The aggregator may be operatively connected to at least one FIFO and the data packet switching logic. One intellectual property core may be coupled to each router via a link utilizing a Network-on-Chip architecture scheme.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following disclosure, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to the use of Network-on-Chip architecture for solid-state memory structures that provide for the access of memory storage blocks via a router. As such, data may be sent to and/or from the memory storage blocks as data packets on the chip. The Network-on-Chip architecture may further be utilized to interconnect unlimited numbers of memory cell matrices, spread on a die, thus allowing for reduced latencies among matrices, selective power control, unlimited memory density growth without major latency penalties, and reduced parasitic capacitance and resistance. Other benefits may include improved signal integrity, larger die areas available to implement memory arrays, and higher frequency of operation.

In the following description of aspects of the present disclosure, reference is made to the accompanying drawings that form a part hereof, and in which is shown by way of illustration of the specific implementations in which the disclosure may be practiced. It should be noted that the figures discussed herein are not drawn to scale and do not indicate actual or relative sizes. Any hatching in the figures is used to distinguish layers and does not represent the type of material used.

Figure 1A:
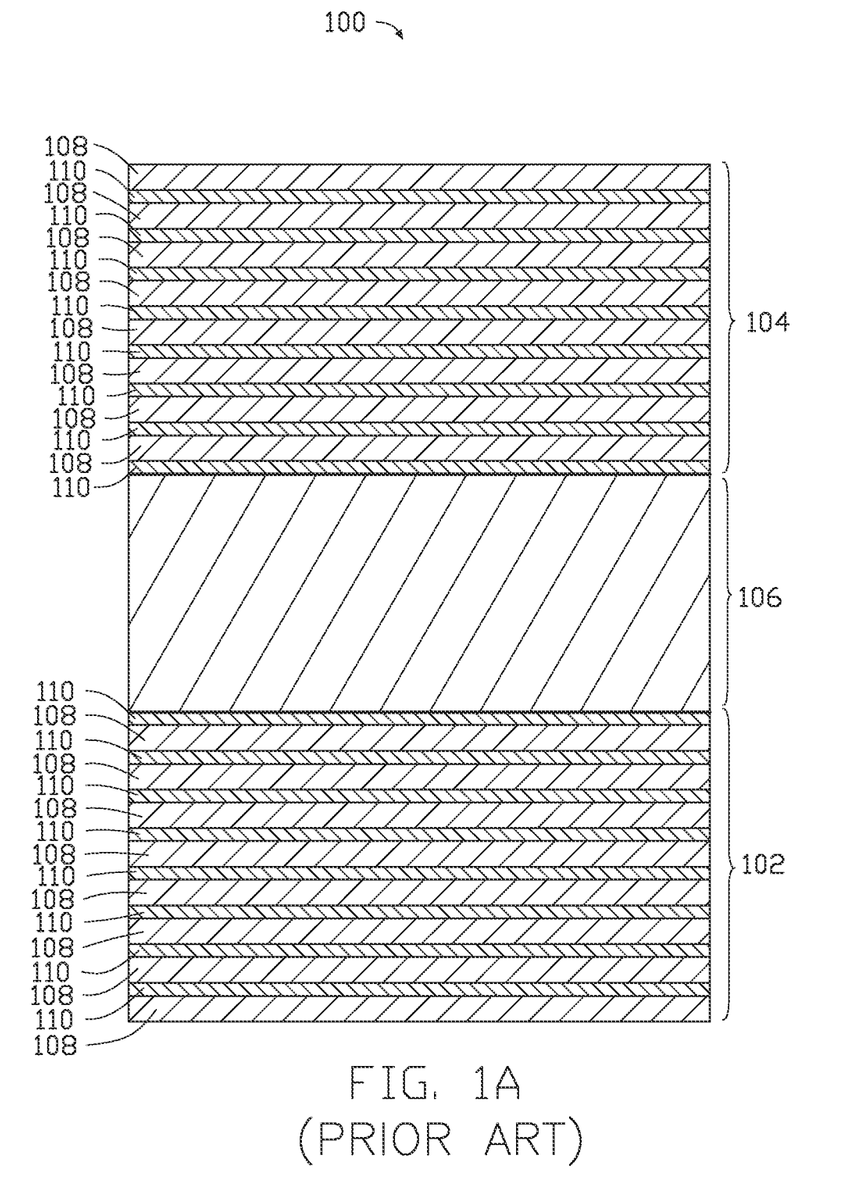
FIG. 1A illustrates architecture of a memory array of a conventional memory device.

FIG. 1A illustrates the architecture of conventional memory banks 102, 104 of a memory device 100 as known in the art. As shown, the memory device 100 may include a first memory bank 102 and a second memory bank 104 operatively connected by interface logic 106. In certain embodiments, the first memory bank 102 and/or the second memory bank may be a subbank. It is contemplated, however, that more memory banks may be utilized within the memory device 100, wherein each memory bank may be connected by interface logic. The first memory bank 102 and the second memory bank 104 may each comprise a plurality of subarrays 108. In certain embodiments, the first memory bank 102 and the second memory bank 104 may each comprise a plurality of subbanks (not shown). Each subarray 108 may be a subarray of memory cells. Interconnectors 110 may separate each subarray 108 within each of the first memory bank 102 and the second memory bank 104. The interconnectors 110 may be wires dedicated to the routing of the entire memory device 100. As shown, approximately about 60% of the area of each of the first memory bank 102 and the second memory bank 104 is dedicated to interconnectors 110.

A drawback of existing memory bank architecture, such as the architecture of the first memory bank 102 and the second memory bank 104 of FIG. 1A, is the amount of wire necessary to route the entire memory device 100. As such, a main cause of latency in existing memory banks, such as those of the first memory bank 102 and the second memory bank 104, is the amount of wire regardless of the type of device (for example, SRAM, DRAM, etc.). As such, a challenge exists in determining the tradeoff between power, area, and latency within such memory devices.

Figure 1B:
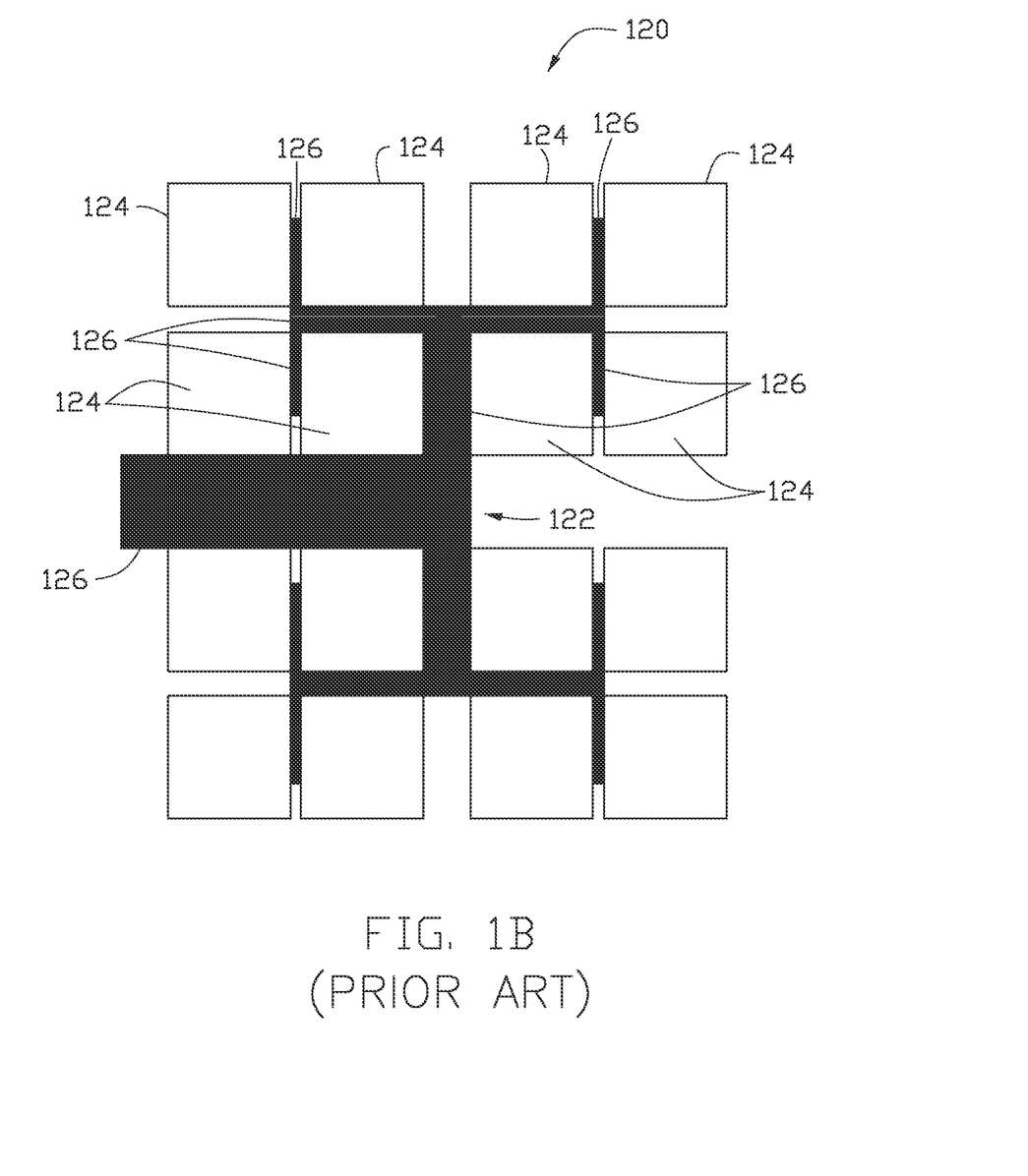
FIG. 1B illustrates an overview of memory bank architecture utilizing a conventional H-Tree technique.

FIG. 1B illustrates another embodiment of a conventional memory bank architecture scheme 120 utilizing an H-Tree routing layout 122. Conventional memory banks may include banks of memory (not shown), each bank being divided into arrays of subbanks (not shown). Each subbank may be further divided into multiple MATs (not shown), and each MAT may be composed of four or more subarrays 124. Each subarray 124 may include predecoding logic (not shown), 2-D memory array cells (not shown), row and column decoders (not shown), wordline drivers (not shown), bitline muxers (not shown), sense amplifiers (not shown), and/or output drivers (not shown). Each element of each subarray 124 may be interconnected with the I/O interface (not shown).

Each subarray 124 may be connected within the conventional memory bank architecture scheme 120 via wire 126. A conventional memory bank architecture scheme 120 utilizing a line size of eight words of 64 bits maintains a total of 512 bits, or metal tracks. As such, collectively, each conventional memory bank architecture scheme 120 may utilize over 8,000 wires 126 to interconnect each subarray 124 therewithin. The utilization of H-Tree routing layout 122 necessitates that power is constantly applied to the entire H-Tree.

The conventional memory bank 102, 104 of FIG. 1A may generally assume the H-Tree routing layout 122. As discussed, supra, the use of the H-Tree routing layout 122 may utilize between about 70% and 80% of the space of the memory device 100 is dedicated to routing wires 126 and I/O fabric interconnection.

Figure 2A:
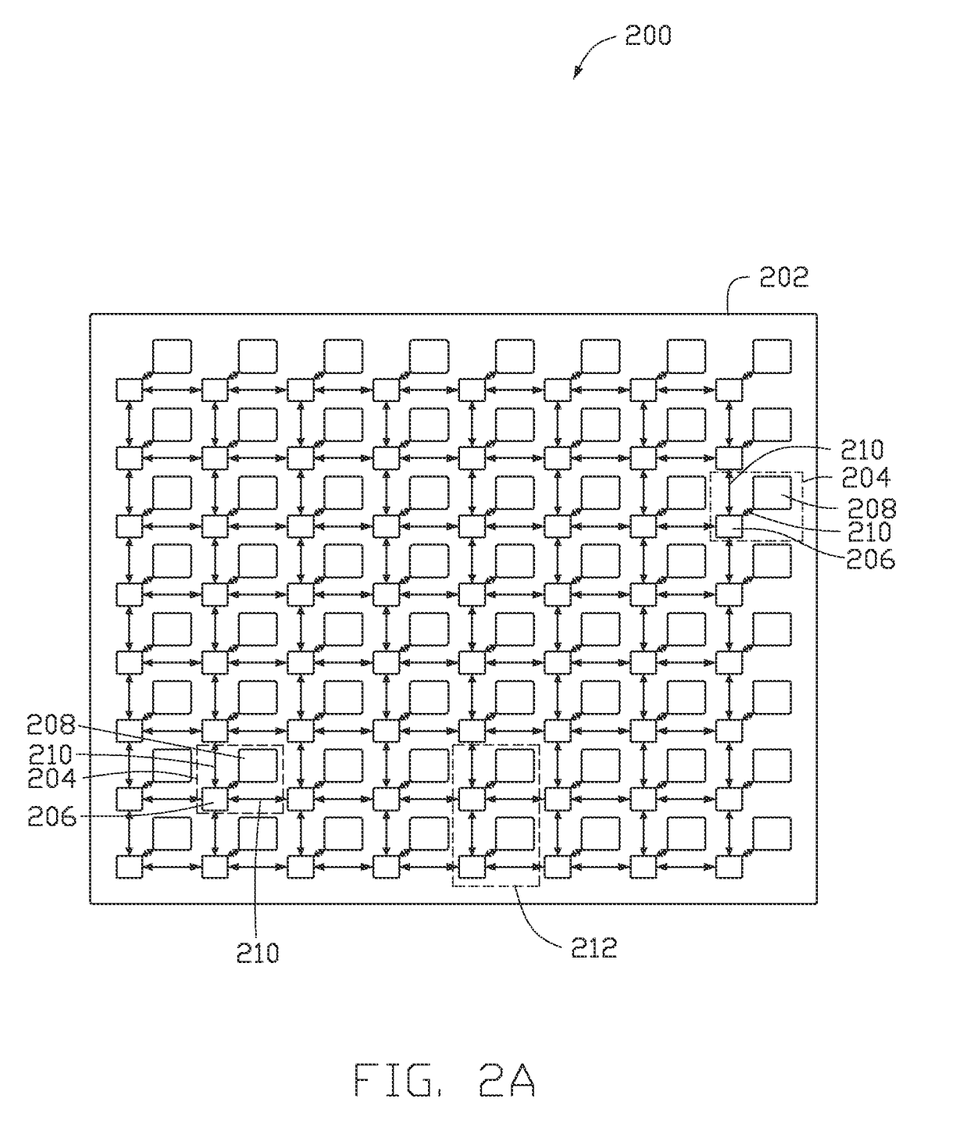
FIG. 2A illustrates a solid-state memory structure utilizing Network-on-Chip architecture according to one embodiment described herein.

FIG. 2A illustrates an embodiment of a memory device 200 utilizing Network-on-Chip architecture 202 with a sparse mesh topography. In certain embodiments, the memory device 200 may be a solid-state memory structure. The use of Network-on-Chip architecture 202 may allow for the interconnection of an unlimited number of nodes, spread on a die, in a linear fashion. As such, the final density of a memory bank and associated latencies may be predicted beforehand. The Network-on-Chip architecture 202 may be an interconnected memory cell matrix. As such, each node 204 may be an individual memory cell matrix. As shown in FIG. 2A the memory device 200 may include a plurality of nodes 204 wherein each node 204 includes at least one router 206 and at least one memory array 208. In certain embodiments, the memory device 200 may include a plurality of nodes 204 wherein each node 204 includes at least one router 206 and at least on subarray (not shown). Each memory array 208 may be an intellectual property core. Each memory array 208 may be accessed and/or reached through the respective router 206. Additionally, data may be sent to and/or from the memory array 208 as data packets on the chip. In certain embodiments, each node 204 may include a plurality of links 210. Each of the plurality of links 210 may interconnect each router 206 of each of the plurality of nodes 204 using the Network-on-Chip architecture 202. As such, the plurality of nodes 204 may be patterned in a grid pattern. Furthermore, each router 206 may be operatively connected with a respective memory array 208 via a link 210. The plurality of nodes 204, including the routers 206 and memory arrays 208 therewithin, may communicate among each other by routing messages over the routers 206 and plurality of links 210 of the sparse mesh.

In certain embodiments, a mesh topology for Network-on-Chip architecture 202 may support silicon implementation of the inherent 2-D structure of the topology, which maps well to planar semiconducting processes. A traditional 2-D mesh topology may assume a regular and/or symmetric layout with uniformly sized nodes 204. It is contemplated, however, that nodes 204 and/or contents of the nodes 204 may vary widely in shape and/or in dimension.

To accommodate memory arrays 208 attached to a Network-on-Chip each router 206 may have a range of addresses, rather than a single address. As such, in some embodiments, each router 206 may have a unique range of addresses rather than X and/or Y coordinates. In certain embodiments, the unique range of addresses for each router 206 may be a unique address. The range of addresses for each router 206 may be a sequential range of addresses. Additionally, each memory array 208 may have a unique address and/or a unique range of addresses rather than X and/or Y coordinates. The range of addresses for each memory array 208 may be a sequential range of addresses, as each memory array 208 is a linear sequence of memory addresses.

As such, a data packet (not shown) may be sent to an address. Each router 206 may have a range of addresses that are defined by the amount of memory available in the node 204. As such, each node 204 may be, by way of example only, 1024 lines or 2048 lines, independently, in the same design. Therefore, the data packet switching logic 222 (See, FIG. 2C) may match a row and column to a field of the data packet and send the data packet to a local port connected with a memory array 208. In certain embodiments, a calculation may be performed and the result compared to the properties of the node 204. If the addressing of the row is larger and/or smaller than the node 204, the data packet may be routed north and/or south. If the addressing of the column is larger and/or smaller than the node 204, the data packet may be routed east and/or west. As such, the topology may enforce the address routing mechanism on the network. The switching logic 222 may perform a calculation to verify that the data packet address is inside a range of the global space. If the data packet address is not within the range of the global space, multiple different routing algorithms may be calculated on the fly to reroute the data packet. If a match of the address is subtracted from the base address, the address inside of the memory array range may be connected to the local port. If a match of the address is not subtracted from the base address, the data packet may be routed to another port. The decision of which port may depend on the topology of the memory device and a routing table. Additionally, the Network-on-Chip architecture may be built in any shape, without modifying or correcting the addressing logic.

Routers 206 may be located at grid points where data packets or message packets may change directions on an X-Y plane and/or exit to host blocks on the Network-on-Chip. As such, routers 206 may be utilized when data packets need to switch from one node 204 to another node 204 on the path of the data packet. A router 206 may be utilized at points where data packets from multiple input links may meet and contend for a common output link.

As further shown in FIG. 2A, each router 206 may be operatively connected to at least one adjacent router 206 via at least one link 210. The plurality of links 210 may interconnect each of the plurality of nodes 204 to form a first two-dimensional mesh, as illustrated by the pattern of the Network-on-Chip architecture 202 of FIG. 2A. In some embodiments, the Network-on-Chip architecture 202 may be two-dimensional. It is contemplated, however, that other the Network-on-Chip architecture 202 may have dimensions greater than two in certain embodiments. The plurality of links 210 may form a plurality of rows and/or a plurality of columns.

The memory device 200 may further include a first router mesh structure 212. The first router mesh structure 212 may include a plurality of routers 206, such as at least two routers 206, and a plurality of memory arrays 208, such as at least two memory arrays 208. Each memory array 208 may be operatively connected to at least one router 206 via a link 210. The first router mesh structure 212 may further include a plurality of nodes 204 having a layout disposed at a first layer. In certain embodiments, an interior portion of the first router mesh may include a standard tile that is tessellated in X and Y directions to form a plurality of N×N meshes. It is contemplated, however, that any tessellation or topology may be utilized to interconnect the nodes 204 in the mesh structure 212 and/or in the Network-on-Chip architecture 202.

As shown in FIG. 2A, approximately sixty-four nodes 204 are shown; however it is contemplated that any number of nodes 204 may be utilized in a memory device, such as memory device 200, utilizing Network-on-Chip architecture.

Figure 2B:
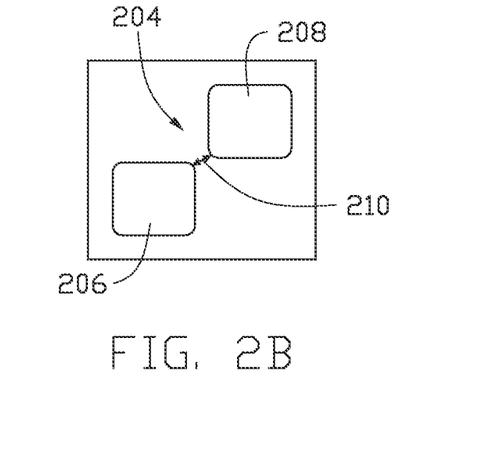
FIG. 2B illustrates an individual router operatively connected to a memory storage block according to one embodiment described herein.

FIG. 2B illustrates an individual node 204, as referenced with respect to FIG. 2A. The node 204 may be a memory cell matrix. As shown in FIG. 2B, the node 204 may include at least one router 206. In some embodiments, the node 204 may further include at least one memory array 208. The memory array 208 may be in an intellectual property core. At least one memory array 208 may be operatively connected with each router via a link 210. Furthermore, each memory array 208 may be accessed via the router 206. Each memory array 208 may be accessed in parallel. In certain embodiments, each router 206 may be sequentially accessed across a path of a data packet without supplying power to the entire memory device.

Each node 204 of the plurality of nodes may be operated on a different frequency. Furthermore, in some embodiments, each node 204 of the plurality of nodes may be operated with a separate voltage. The separate voltage may be selected and/or generated on the fly.

Figure 2C:
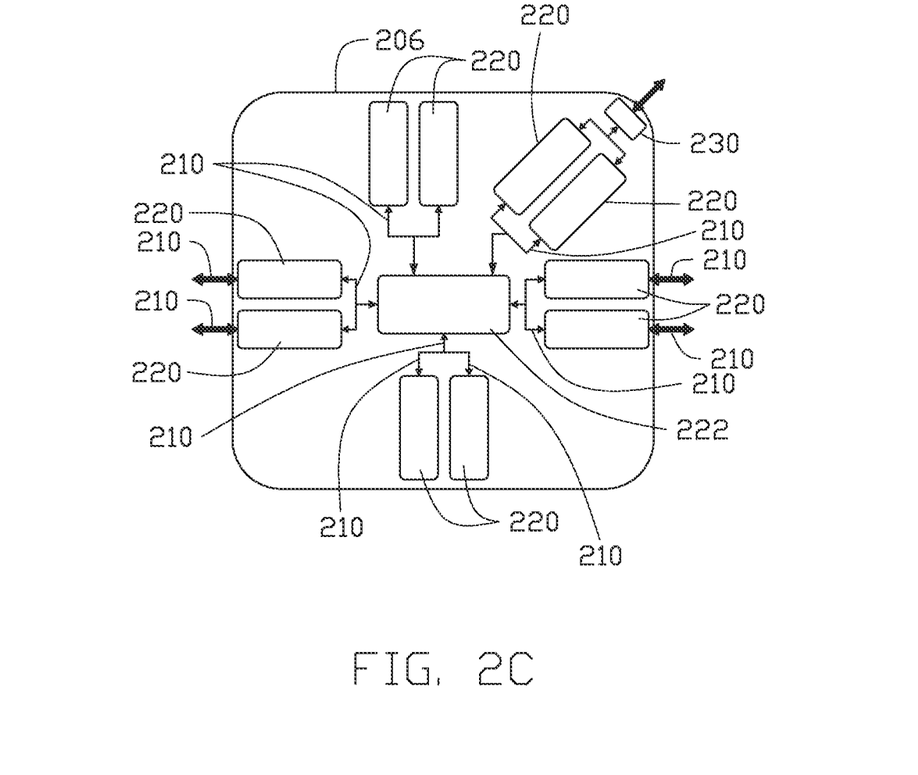
FIG. 2C illustrates a router according to one embodiment described herein.

FIG. 2C illustrates an embodiment of the router 206. Each router 206 may include a plurality of first in-first out devices (FIFOs) 220. Each FIFO 220 may organize and/or manipulate a data buffer such that the first entry received is the processed first. In some embodiments, the plurality of FIFOs 220 may be at least six FIFOs 220. In another embodiment, the plurality of FIFOs 220 may be ten FIFOs 220. It is contemplated however, that any number of FIFOs 220 may be utilized. Each channel may be a full-duplex path, including an input and an output interface. The input and output interface may be able to send and receive data in parallel. Each transmitter interface may be operatively connected with a FIFO 220. Each receiver interface may be operatively connected with a FIFO 220. As such, the communication may occur across the FIFOs 220, thus completely separating the internals of each router 206. Each FIFO 220 may be operatively connected to an adjoining FIFO 220 as a pair of FIFOs 220. In some embodiments, each router 206 may further include data packet switching logic 222. Each FIFO 220 may allow for the individual breaking of clock domains across multiple channels. Each channel may be operated at an independent operating frequency. Furthermore, each channel may be a full-duplex channel. Each channel may be operated on a different bandwidth.

The use of a FIFO 220 may allow for the breaking of clock domains one-by-one completely independently across various channels. As such, a full duplex channel may operate in different bandwidths and/or operating frequencies. Furthermore, each channel may operate in different and independent frequencies. The use of a FIFO 220 may allow for an EDA tool to route a Clock Tree Synthesis with improved performance and/or improved signal to noise ratio. Additionally, each FIFO 220 may be implemented with non-volatile and/or volatile technology, for example, SRAM and/or MRAM. Furthermore, the internal logic of the router 206, switching logic 222, and aggregator 230 may operate in different clock-domains. The different clock domains may be on different and/or multiple frequencies. In another embodiment, the different clock domains may be aligned out of phase. As such, future expansion of the design into GaLs (Globally Asynchronous Locally Synchronous) may be permitted.

As further shown in FIG. 2C the router 206 may further include an aggregator 230. Although one aggregator 230 is shown, it is contemplated that any number of aggregators 230 may be utilized. The aggregator 230 may be connected to the data packet switching logic 222 via link 210, or any other interconnection such as a wire. Furthermore, although one aggregator 230 is shown, it is contemplated that any number of switching logics 222 may be utilized and/or operatively connected to the aggregator 230. The aggregator 230 may further be connected to at least one FIFO 220 via link 210, such that the at least one FIFOs 220 are between the data packet switching logic 222, or multiple data packet switching logics 222, and the aggregator 230. In certain embodiments, the FIFOs 220 may be connected to the aggregator 230, such that the at least one FIFOs 220 is between the aggregator 230 and the switching logic 222. As such, the aggregator 230 may be operatively connected to the memory array 208. In some embodiments, the connection between the aggregator 230 and the FIFOs 220 may allow for access to the memory array 208. In certain embodiments, the aggregator 230 may perform translations between a network channel and the memory array 208. In other embodiments, the aggregator 230 may perform translations between multiple network channels and the memory array 208. In one embodiment, the aggregator 230 may be connected to the FIFOs 220 connected to the memory array 208. In certain embodiments, the aggregator 230 may be connected to some or all of the FIFOs 220 of the router 206. The aggregator 230 may translate from the Network-on-Chip architecture between the router 206 and the memory array 208. In certain embodiments, the aggregator 230 may concentrate multiple channels.

Data packets (not shown) may be fragmented, such that data may be sent to and from the memory array 208 via the router 206 and/or the plurality of links 210 as a fragmented data packet. For example, 64 bits may be broken into four packets of 16 bits or eight packets of eight bits. The same path need not be followed to send each data packet to its destination. As such, four clock cycles plus hops are needed to transit the data packet across the network to read or write the memory in any position. Furthermore, the amount of wires, as shown with reference to FIGS. 1A and 1B, is reduced with the use of Network-on-Chip architecture 202, as shown with reference to the memory device 200 of FIG. 2A. Due the low amount of wires across each node and the use of FIFOs 220, the memory device 200 may operate at increased frequencies as compared to the memory device shown in FIGS. 1A and 1B. Additional embodiments may include the usage of SerDes across Network-on-Chip channels (e.g. serializers/deserializers) to use a single metal track and/or wire for each channel.

Additionally, given the layout and hierarchy defined by the Network-on-Chip architecture 202, a linear prediction of the total latency of any communication in a given system in a specific process node 204, prior to fabrication, may be had. Furthermore, the final power consumption of a memory device may be accurately predicted. In addition, specific routers 206 may be activated sequentially across the path of a data packet as it travels across the network, without having to power the entire network. Additionally, the memory arrays may not require power unless the memory arrays are in use, despite any ongoing communication traffic in the memory device 200.

Figure 2D:
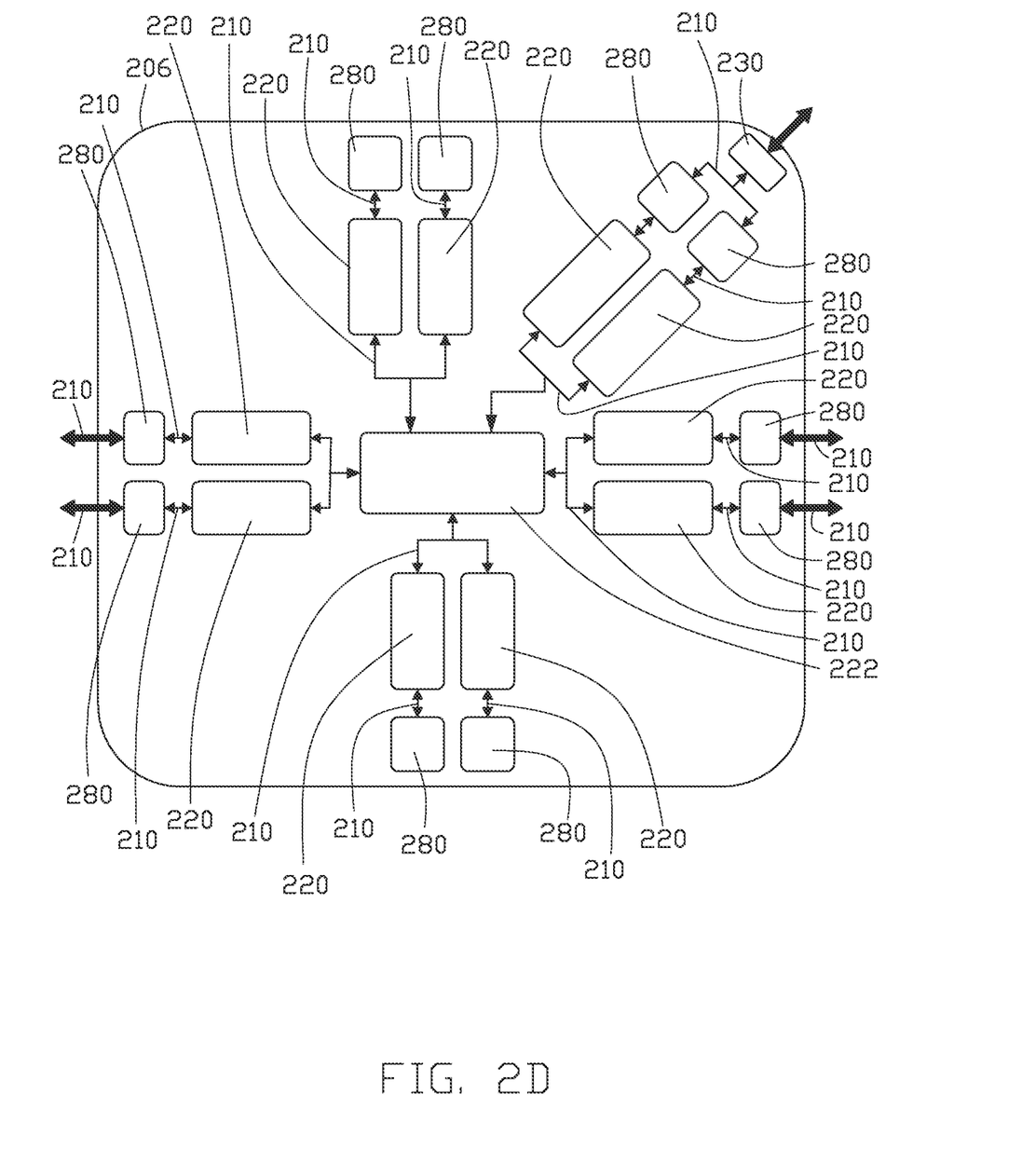
FIG. 2D illustrates a router according to one embodiment described herein.

In certain embodiments, the memory device 200 may further include a plurality of modulators and/or a plurality of demodulators. FIG. 2D illustrates another embodiment of router 206. In some embodiments, the router 206 may provide single lane communication, which may be an optical channel. As such, the router 206 may include a plurality of modulators/demodulators 280. The modulator/demodulator 280 may modulate signals to encode digital information and demodulate signals to decode the transmitted information. Each FIFO 220 of the router 206 may be operatively connected with a modulator/demodulator 280 via a link 210. The modulator/demodulator 280 may operatively connect one router 206 to another router 206 via link 210. In certain embodiments, the link 210 may be a lane. The lane may be a plurality of wires, a single wire or metal track, and/or a single optical channel or a plurality of optical channels if optoelectronics are utilized. In certain embodiments, the link 210 may be a channel, such as an optical channel or lane, and/or a metallic link. As such, the modulator/demodulator 280 may modulate and/or demodulate the signal data sent via the single lane communication.

Benefits of the present disclosure include reduced latencies among matrices, selective power control as the power source of unused clusters may be completely shut down while those power sources of clusters in use may receive power. Additional benefits include that the memory density may be indefinitely grown without latency penalties, limited by physical factors of the fabrication process and the die size. Further benefits include reduced parasitic capacitance and resistance, improved signal integrity, more die area available to implement memory arrays thus allowing for higher memory density, and higher frequency of operation. Also, multiple channels may be built in each router, allowing for multiple data packets to be exchanged across the routers, thus adding to the concept of priority communication into the memory device. Additionally, each FIFO may be utilized with volatile and/or non-volatile technologies, such as, by way of example only, SRAM, MRAM, PCM, ReRAM, and/or FLASH.

While the foregoing is directed to embodiments of the disclosure, other and further embodiments may be devised without departing from the basic scope thereof, and the scope thereof is determined by the claims that follow.

What is claimed is:

1. A memory structure, comprising:
   a plurality of nodes, each node comprising:
   a memory array, the memory arrays of the plurality of nodes interconnected to form an interconnected memory cell matrix, each memory array having a respective sequence of memory addresses in a global address space of the interconnected memory cell matrix, the memory array selectively powered for use; and
   a router that is connected to the memory array and is powered independently of the memory array, comprising:
      data packet switching logic to route data packets to other nodes of the interconnected memory cell matrix based on addresses of data packets within the global address space in respective sequences of memory arrays of the other nodes and route data packets to locations in the respective memory array connected to the router based on addresses of data packets in the respective sequence of memory addresses of the respective memory array,
      a plurality of network channels, each network channel coupled to the data packet switching logic and comprising one or more first-in first-out (FIFO)s,
      an aggregator, and
      a direct physical link connecting the aggregator to the memory array of the node, the aggregator configured to operatively couple the memory array of the node with the data packet switching logic of the router through the direct physical link; and
   a plurality of network links interconnecting the plurality of nodes through respective network channels of the nodes, the plurality of network links configured to communicate a data packet through a set of two or more nodes of the plurality of nodes by sequentially powering each router of the set of two or more nodes without powering corresponding memory arrays of the set of two or more nodes, while routers and memory arrays of other nodes of the plurality of nodes other than the set of two or more nodes do not receive power.

2. The memory structure of claim 1, wherein:
   the nodes are arranged in a pattern, and each router is operatively connected to at least one adjacent router in the pattern.

3. The memory structure of claim 1, wherein the plurality of nodes form a plurality of rows and a plurality of columns.

4. The memory structure of claim 1, wherein the direct physical link connecting the aggregator of a first node to the memory array of the first node comprises one or more of a lane, a wire, a metal track, and an optical channel.

5. The memory structure of claim 1, further comprising a first router mesh, the first router mesh comprising the plurality of nodes and having a layout disposed at a first layer.

6. The memory structure of claim 5, wherein an interior portion of the first router mesh comprises a tile that is tessellated in X and Y directions to form a plurality of N×N meshes.

7. The memory structure of claim 1, wherein each router comprises one of six FIFOs and ten FIFOs.

8. The memory structure of claim 1, wherein:
   each router is assigned a unique range of addresses in a Network-on-Chip routing scheme, such that the unique range of addresses assigned to the router of each node corresponds to a range of memory addresses of the memory array directly connected to the router, and the data packet switching logic of each node is configured to route data packets based on addresses of the data packets and the unique ranges of addresses assigned to respective routers.

9. The memory structure of claim 1, wherein each memory array is accessible in parallel.

10. The memory structure of claim 1, wherein:
    each node is configured to operate at a respective frequency, and a first one of the nodes is configured to operate at a different frequency than a second one of the nodes.

11. The memory structure of claim 1, wherein:
    each node is configured to operate at a respective voltage, and a first one of the nodes is configured to operate at a different voltage than a second one of the nodes.

12. The memory structure of claim 1, wherein:
    each channel is capable of being operated at a respective frequency, and a first router is configured to operate a first channel at a first frequency and to operate a second channel at a second frequency, different from the first frequency.

13. The memory structure of claim 1, wherein:
    one or more channels of a first router are full-duplex channels, and each of the one or more channels is capable of operating at a respective bandwidth.

14. The memory structure of claim 1, wherein the plurality of nodes are arranged in a grid pattern on a die.

15. The memory structure of claim 1, wherein the aggregator of each router is operatively connected to the data packet switching logic of the router through at least one FIFO of the router.

16. A memory device, comprising:
    an interconnected network comprising a plurality of routers arranged within a memory chip; and
    a plurality of memory arrays embodied on the memory chip, each memory array having a respective sequence of memory addresses and being connected to a respective one of the routers to form an interconnected memory cell matrix having a global address space that includes the respective sequences of memory addresses of the plurality of memory arrays, each memory array selectively powered for use, wherein:
    each router is coupled to one or more adjacent routers in the interconnected network by respective network links of the routers, each router comprises a unique range of network addresses of the interconnected network, the unique range of network addresses of each router corresponding to the sequence of memory addresses of the memory array connected to the router, and each router is configured to route packets to other routers within the interconnected network based on addresses of packets within the global address space in respective ranges of network addresses of the other routers and to route packets to locations in the memory array connected to the router based on network addresses of the packets in the respective sequence of memory addresses of the memory array connected to the router; and the interconnected network is configured to communicate a packet through a set of two or more routers of the plurality of routers by sequentially powering each router of the set of two or more routers without powering memory arrays connected to the two or more routers, while routers other than the set of two or more routers do not receive power.

17. The memory device of claim 16, wherein the plurality of routers are arranged in a grid pattern on the memory chip.

18. The memory device of claim 16, wherein each router further comprises pairs of first-in first-out (FIFO)s, each pair of FIFOs coupled to one of a network link of the router and the memory link of the router.

19. The memory device of claim 18, wherein each router further comprises a modulator/demodulator connected with a FIFO of one of the pairs of FIFOs.

20. The memory device of claim 16, further comprising a plurality of physical links, each physical link directly connecting one of the memory arrays with one of the routers.

21. The memory device of claim 16, wherein each router further comprises data packet switching logic configured to:
receive a data packet having a network address;
send the data packet to the memory array directly connected to the router in response to the network address of the data packet being inside the unique network address range of the router; and
send the data packet to an adjacent router through a network link in response to the network address of the data packet being outside the unique network address range of the router.

22. The memory device of claim 16, wherein each router further comprises:
a memory link directly connecting the router to one of the memory arrays;
data packet switching logic operatively connected to the network links coupling the router to the one or more adjacent routers in the interconnected network; and
an aggregator operatively connected to the data packet switching logic and the memory link, the aggregator configured to perform translations between the network links and the memory array.

23. The memory device of claim 22, wherein the aggregator is coupled to the memory link of the router through one or more first-in first-out (FIFO)s.

24. A memory die, comprising:
a router mesh structure comprising:
a plurality of memory arrays, the plurality of memory arrays interconnected to form an interconnected memory cell matrix, each memory array having a respective sequence of memory addresses in a global address space of the interconnected memory cell matrix, each memory array selectively powered for use;
a plurality of routers, each router connected to a respective memory array; and
a plurality of network links, each network link connecting adjacent routers of the router mesh structure, such that the plurality of routers of the router mesh structure are interconnected in a Network-on-Chip architecture, the plurality of network links configured for sequential activation of two or more routers along a path of a data packet while other routers of the plurality of routers do not receive power and memory arrays connected to the two or more routers do not receive power;
wherein each router comprises:
data packet switching logic coupled to two or more of the network links to route data packets to other routers of the router mesh structure based on addresses of data packets within the global address space in respective sequences of memory arrays connected to the other routers and route data packets to locations in the respective memory array connected to the router based on addresses of data packets in the respective sequence of memory addresses of the respective memory array;
an aggregator configured to operatively couple to the data packet switching logic;
an internal link directly connecting the aggregator to one of the plurality of memory arrays such that each of the routers is directly connected to a respective one of the memory arrays by the internal link of the router.

25. The memory die of claim 24, wherein the plurality of routers and the plurality of memory arrays are spread in a grid pattern on the memory die.

26. The memory die of claim 24, wherein each router comprises a plurality of first-in first-out (FIFO)s, each FIFO coupled to the data packet switching logic of the router and one of a network link and the internal link of the router.

27. The memory die of claim 26, wherein the aggregator of each router is further configured to translate between the Network-on-Chip architecture and the memory array directly connected to the router.

28. The memory die of claim 24, wherein the memory arrays comprise solid state memory arrays.

29. The memory die of claim 24, wherein the data packet switching logic of each router is configured to route data packets received at the router within the Network-on-Chip architecture, wherein routing a data packet comprises:
determining whether a network address of the data packet corresponds to a network address of the router;
transmitting the data packet to another router on a selected network link in response to determining that the network address of the data packet is outside the plurality of network addresses of the router; and
transmitting the data packet to the memory array directly coupled to the router in response to determining that the network address of the data packet corresponds to a network address of the router.

30. The memory device of claim 16 wherein the interconnected network is configured to communicate a data packet through two or more routers of the plurality of routers by sequentially powering each router of the two or more routers without powering memory arrays connected to each of the two or more routers while routers of the plurality of routers other than the two or more routers do not receive power.

* * * * *